United States Patent
Yaman et al.

(10) Patent No.: US 11,467,061 B2
(45) Date of Patent: Oct. 11, 2022

(54) ESTIMATING MODE FIELD DISTRIBUTION IN OPTICAL FIBERS FROM GUIDED ACOUSTIC WAVE BRILLOUIN SCATTERING

(71) Applicant: NEC Laboratories America, Inc., Princeton, NJ (US)

(72) Inventors: Fatih Yaman, Princeton, NJ (US); Eduardo Mateo Rodriguez, Tokyo (JP); Shinsuke Fujisawa, Princeton, NJ (US); Hussam Batshon, Monroe, NJ (US); Kohei Nakamura, Tokyo (JP); Takanori Inoue, Tokyo (JP); Yoshihisa Inada, Tokyo (JP); Takaaki Ogata, Tokyo (JP)

(73) Assignee: NEC Corporation

( * ) Notice: Subject to any disclaimer, the term of this patent is extended or adjusted under 35 U.S.C. 154(b) by 0 days.

(21) Appl. No.: 17/341,033

(22) Filed: Jun. 7, 2021

(65) Prior Publication Data
US 2022/0011195 A1    Jan. 13, 2022

Related U.S. Application Data

(60) Provisional application No. 63/141,068, filed on Oct. 25, 2021, provisional application No. 63/035,959, filed on Jun. 8, 2020.

(51) Int. Cl.
*G01M 11/00*    (2006.01)

(52) U.S. Cl.
CPC .................. *G01M 11/331* (2013.01)

(58) Field of Classification Search
CPC .... G01M 11/331; G01M 11/33; G01H 9/004; H04B 10/0731
See application file for complete search history.

(56) References Cited

U.S. PATENT DOCUMENTS

| | | | |
|---|---|---|---|
| 2012/0274927 A1* | 11/2012 | Li | G01K 11/32 356/73.1 |
| 2020/0149878 A1* | 5/2020 | Zadok | G02B 6/1225 |
| 2022/0170817 A1* | 6/2022 | Sagae | G01M 11/319 |
| 2022/0173808 A1* | 6/2022 | Yaman | H04B 10/2916 |

* cited by examiner

*Primary Examiner* — Hwa Andrew Lee
(74) *Attorney, Agent, or Firm* — Joseph Kolodka

(57) ABSTRACT

Aspects of the present disclosure describe a method for estimating mode field distribution in optical fibers from guided acoustic-wave Brillouin scattering wherein light for which the optical mode-field distribution is determined remains in the optical fibers and the distribution is made for light inside the fiber, and not at a fiber/air interface or other perturbation points to the fiber resulting in a more accurate representation of the optical mode-field distribution in the fiber. Since light is always in the fiber during the determination, no complicated fiber preparation steps or procedures are required and the mode-field distribution is determined as an average distribution along the length of the fiber under test.

8 Claims, 14 Drawing Sheets

ESTIMATING MODE FIELD DISTRIBUTION IN OPTICAL FIBERS FROM GUIDED ACOUSTIC WAVE BRILLOUIN SCATTERING

CROSS REFERENCE

This disclosure claims the benefit of U.S. Provisional Patent Application Ser. No. 63/035,959 filed Jun. 8, 2020 and U.S. Provisional Patent Application Ser. No. 63/141,068 filed Jan. 25, 2021, the entire contents of each is incorporated by reference as if set forth at length herein.

TECHNICAL FIELD

This disclosure relates generally to optical fiber communications. More particularly it pertains to the estimation of mode field distribution in optical fibers from guided acoustic-wave Brillouin scattering.

BACKGROUND

As is known in the art, optical fibers are widely used in contemporary telecommunications systems to guide optical signals in one or more glass cores comprising the fibers. In a typical configuration, most of an optical field is confined in these cores. The distribution of optical field intensity in space in and around the optical core(s) is considered the optical mode field distribution. Normally, these distributions are considered separately for different propagation modes of the fiber. Many important parameters of optical transmission that determine the transmission characteristics of the fibers are determined by the mode field distribution, such as an effective area that largely determines fiber nonlinearity, fiber loss, fiber dispersion, etc. Accordingly, an accurate characterization of the optical mode field distribution is important, both from a design and manufacturing point of view and to estimate the overall transmission characteristics of an existing fiber.

SUMMARY

An advance in the art is made according to aspects of the present disclosure directed to a method for estimating mode-field distribution in an optical fiber under test (FUT).

In sharp contrast to the prior art, the method according to aspects of the present disclosure estimate the mode field distribution in optical fibers from guided acoustic-wave Brillouin scattering wherein light for which the optical mode-field distribution is determined remains in the optical fibers and the distribution is made for light inside the fiber, and not at a fiber/air interface or other perturbation points to the fiber resulting in a more accurate representation of the optical mode-field distribution in the fiber. Since light is always in the fiber during the determination, no complicated fiber preparation steps or procedures are required and the mode-field distribution is determined as an average distribution along the length of the fiber under test.

BRIEF DESCRIPTION OF THE DRAWING

A more complete understanding of the present disclosure may be realized by reference to the accompanying drawing in which.

Figure 5:
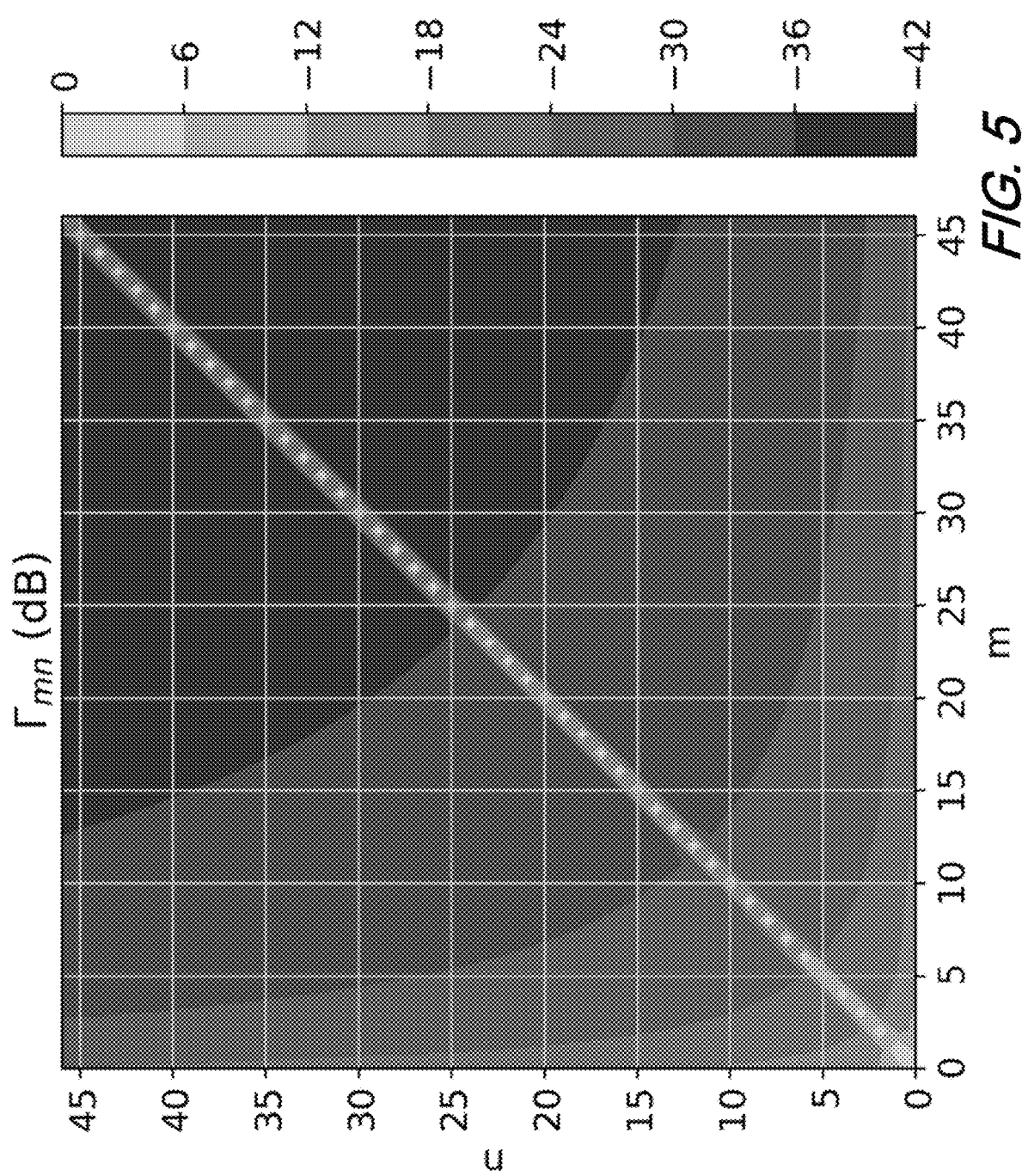
Figure 6:
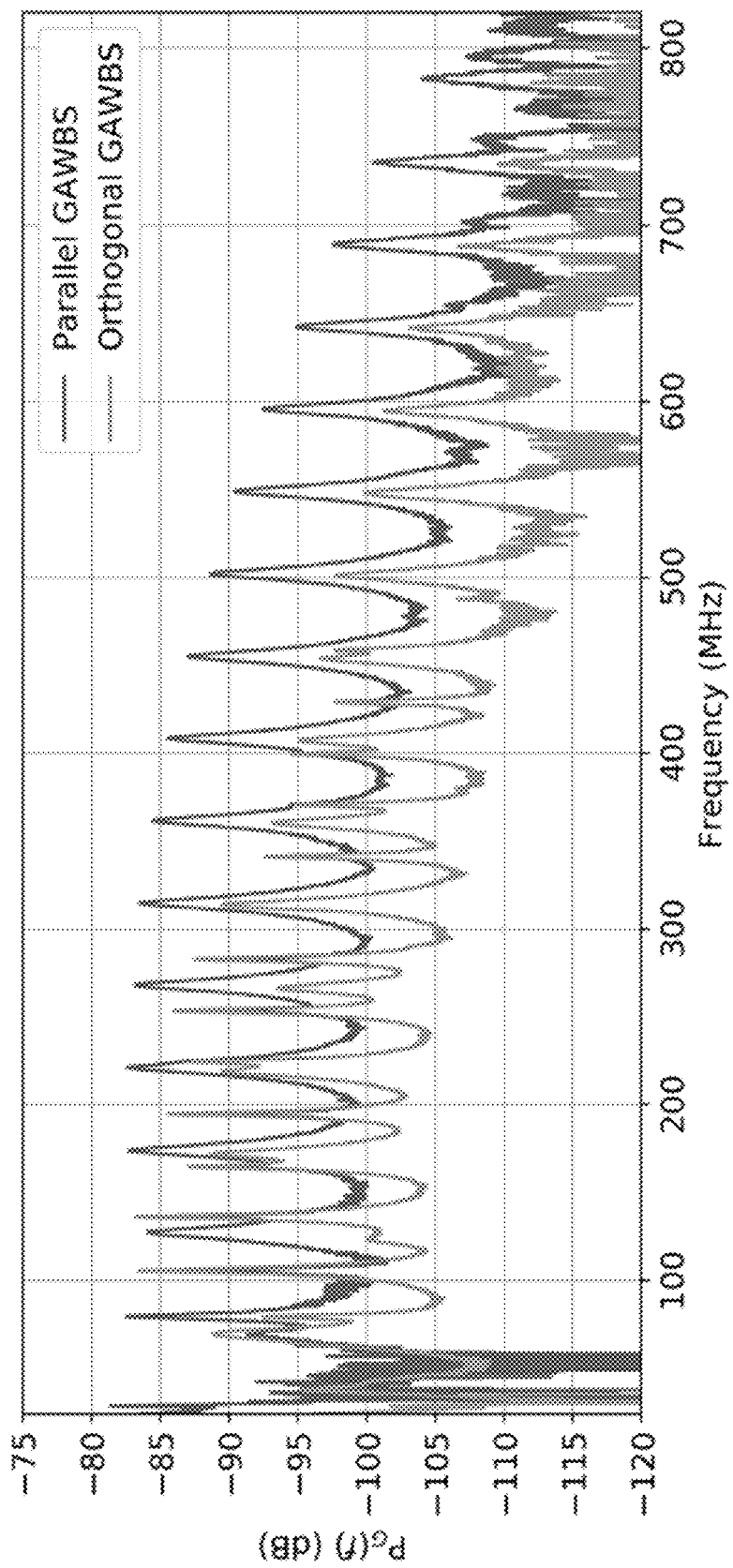
Figure 7:
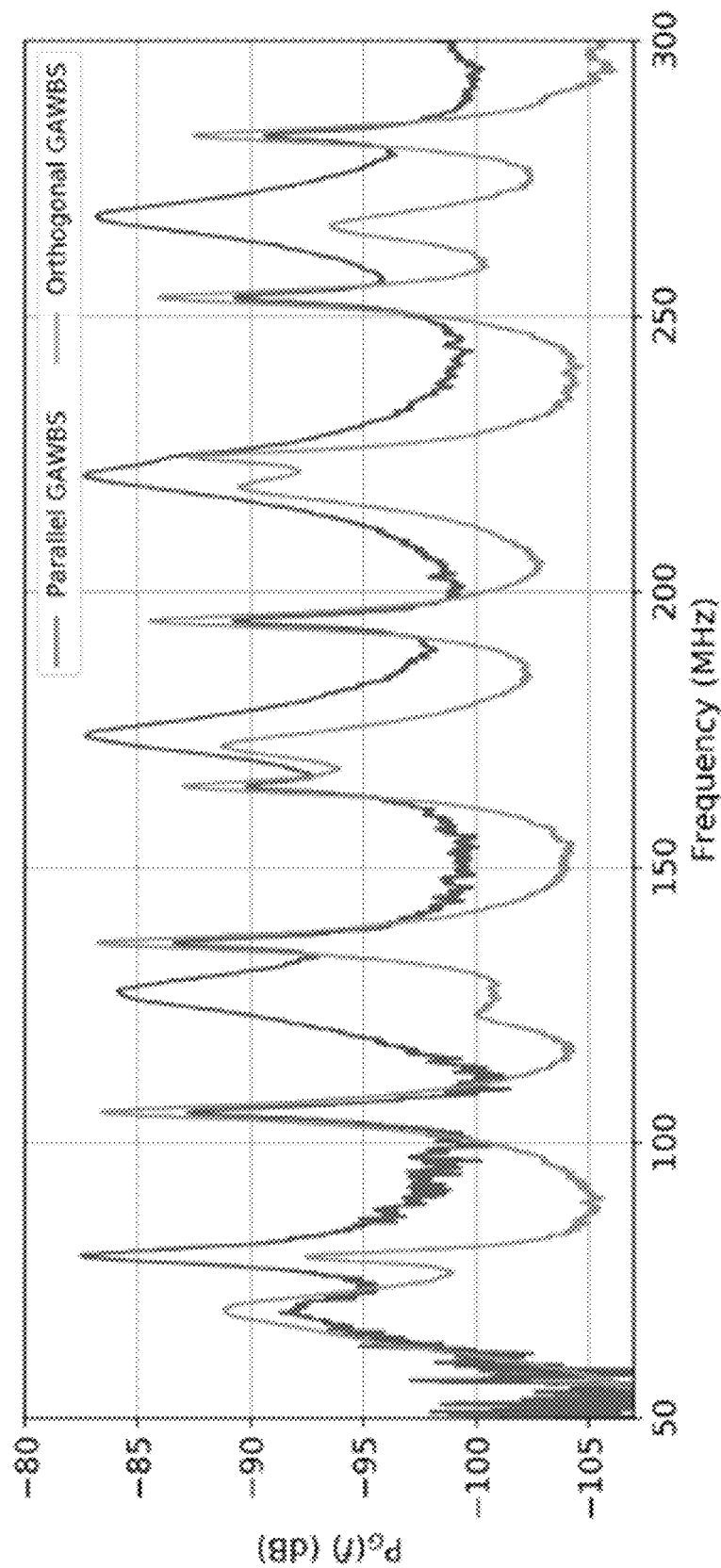
Figure 8:
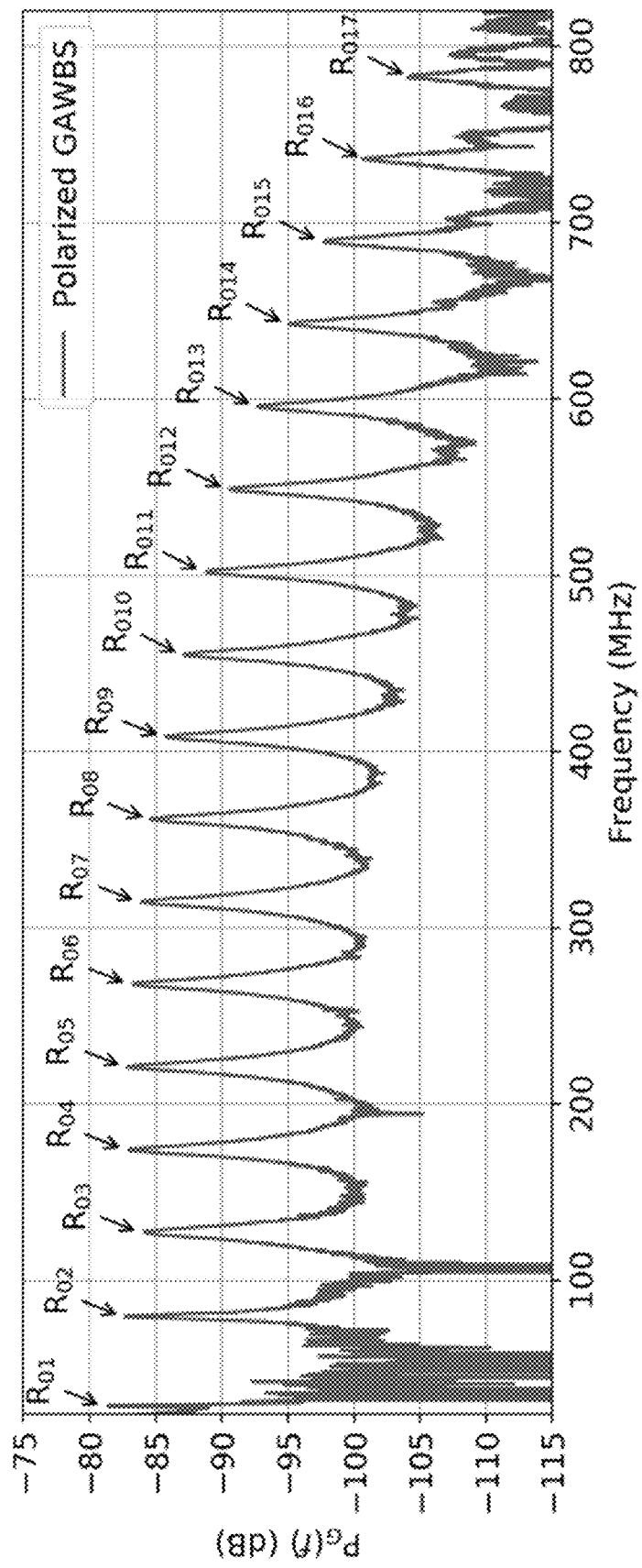
Figure 9:
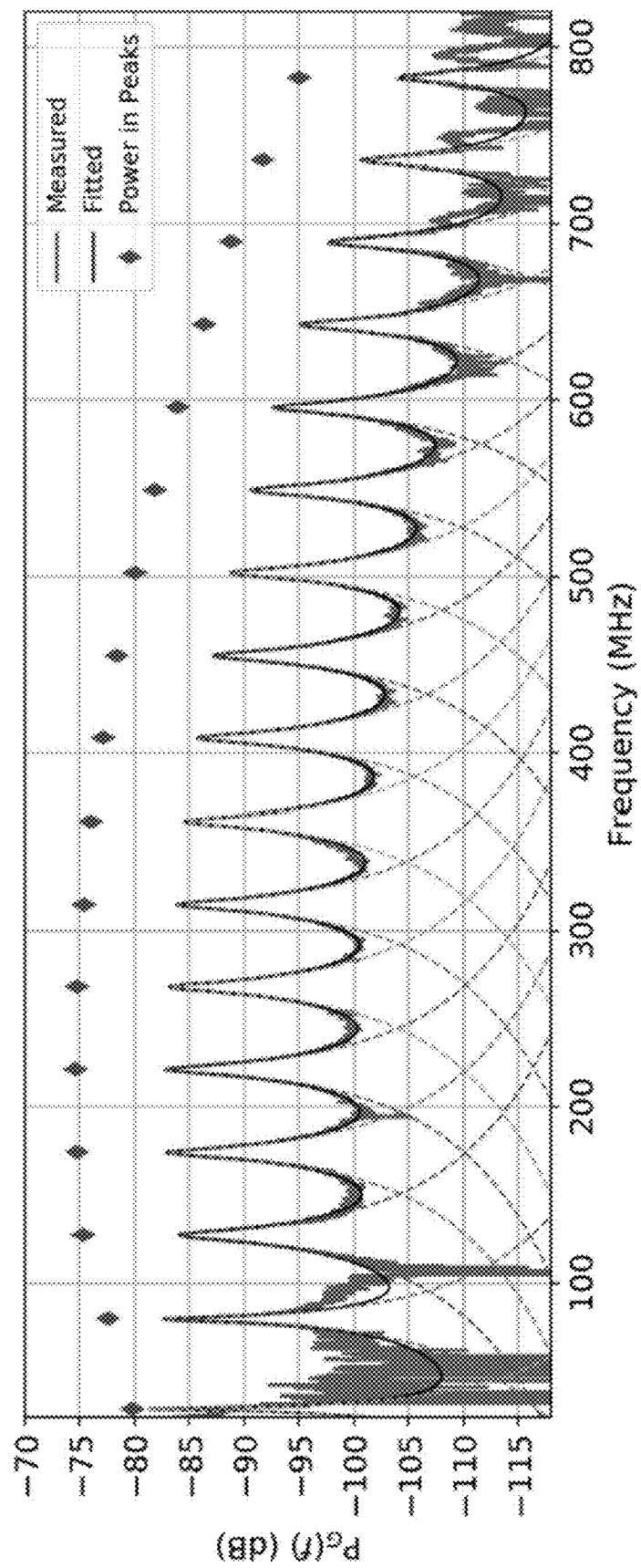
Figure 10:
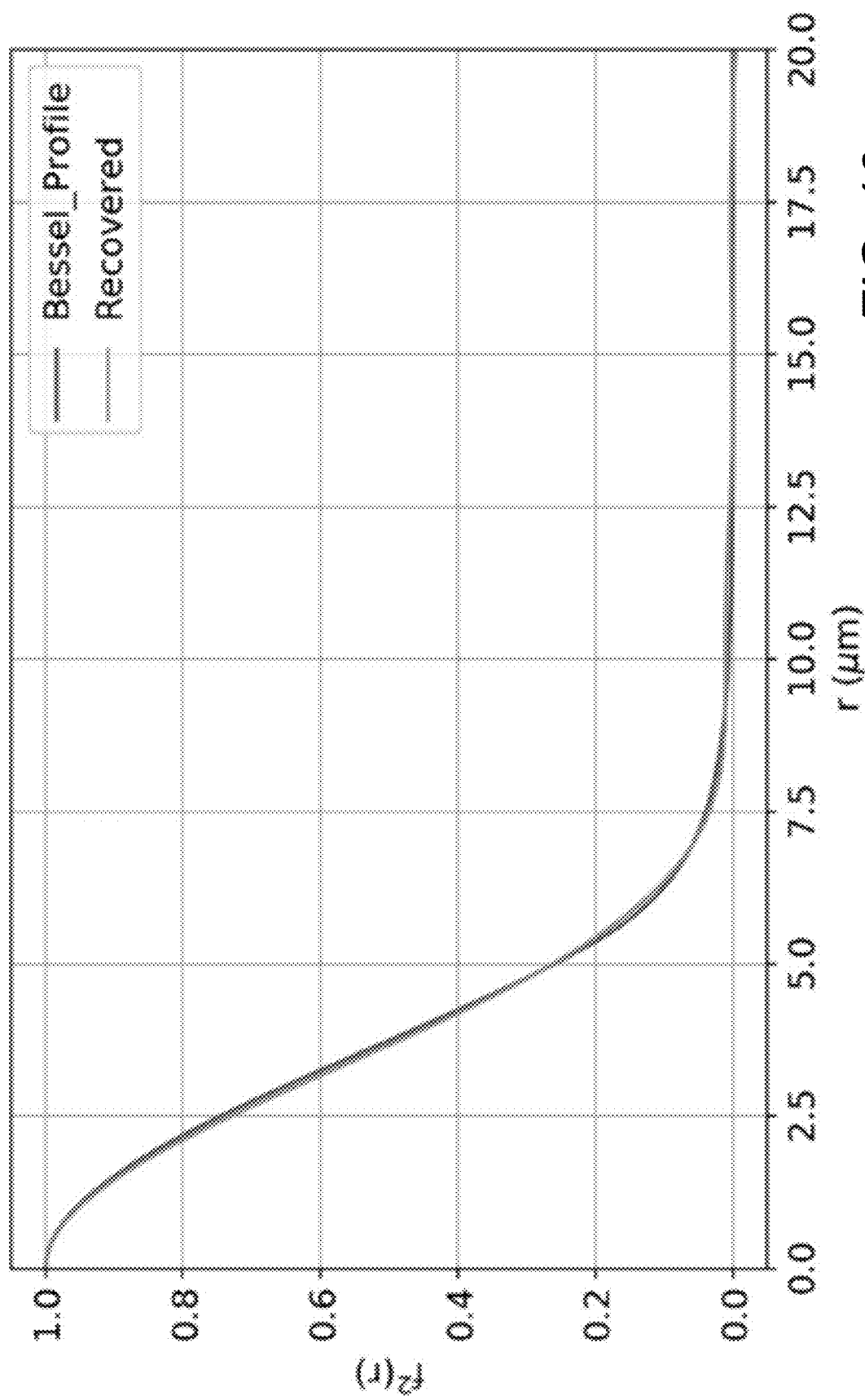
Figure 11:
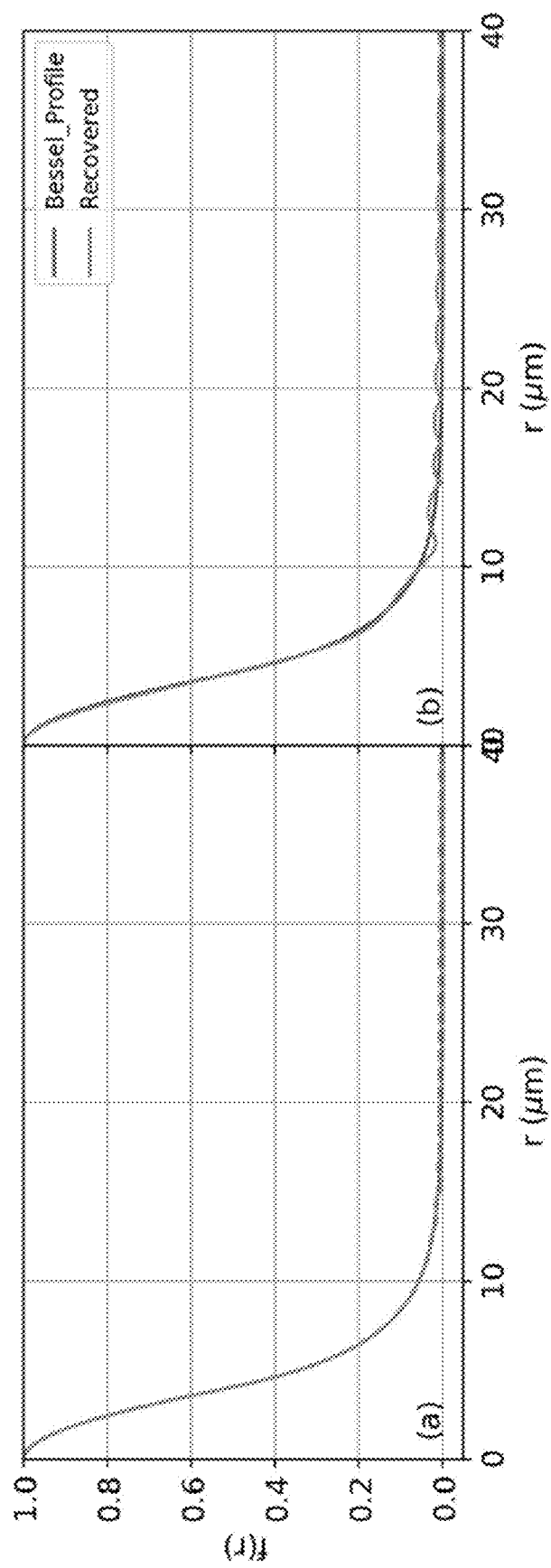
Figure 12:
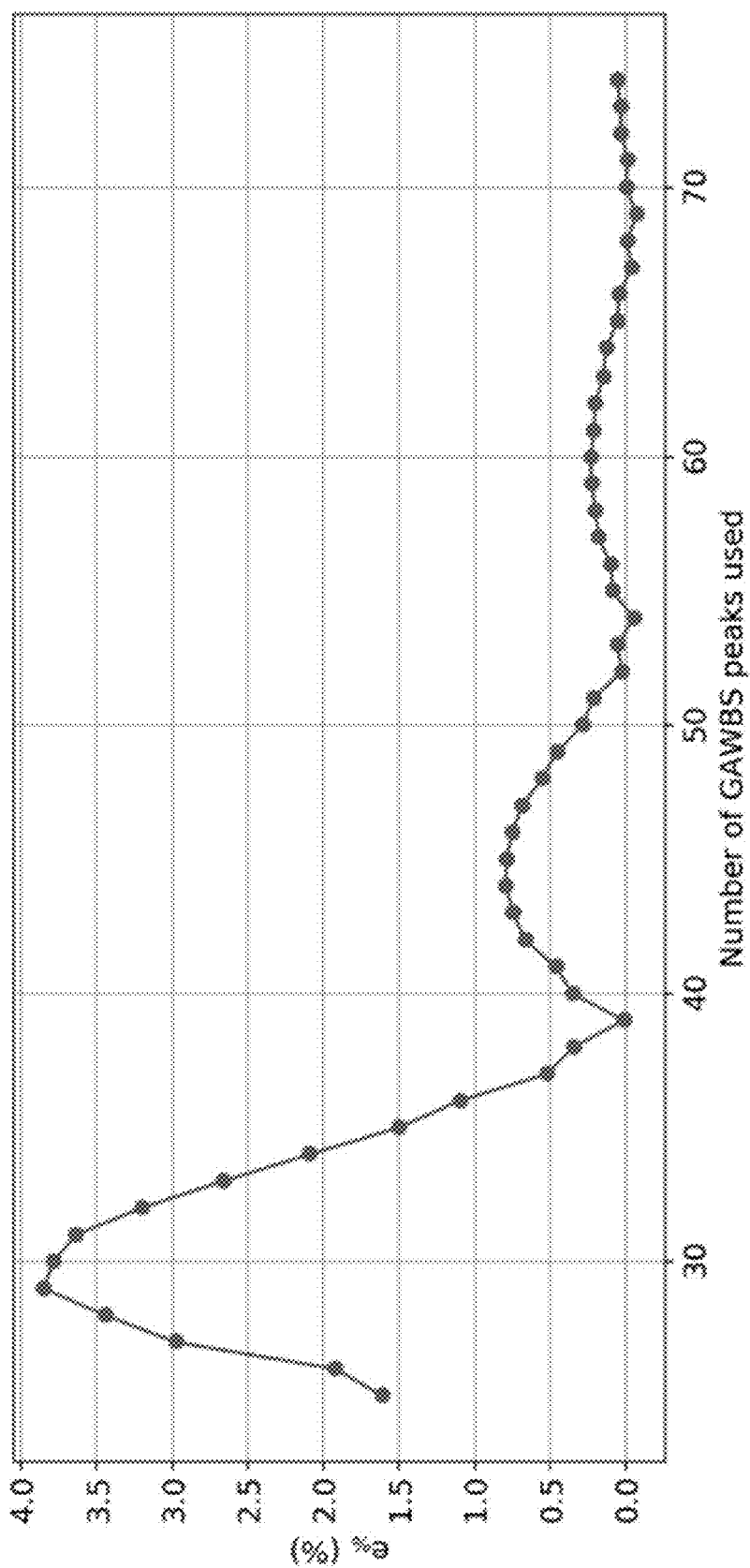
Figure 13A:
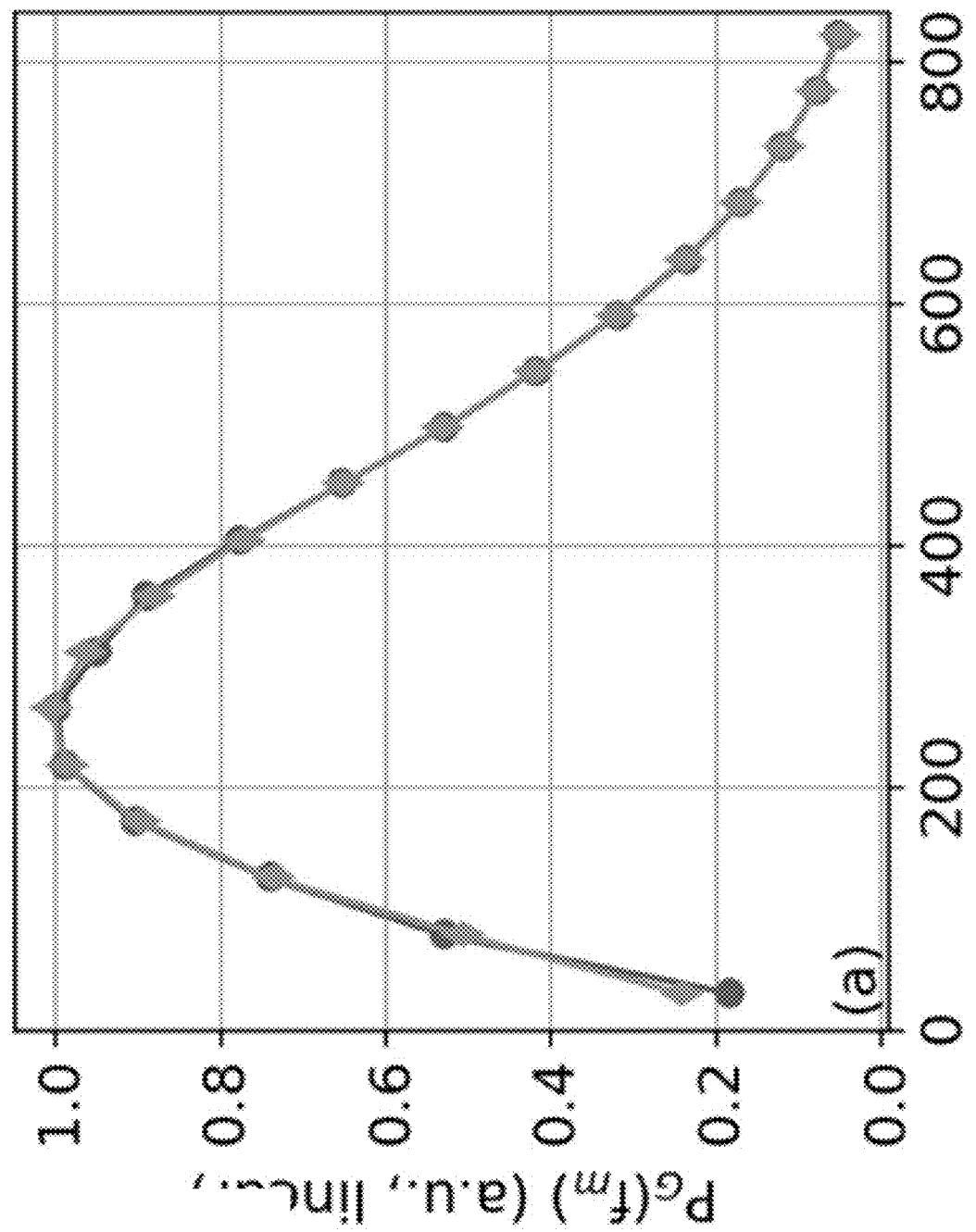
Figure 13B:
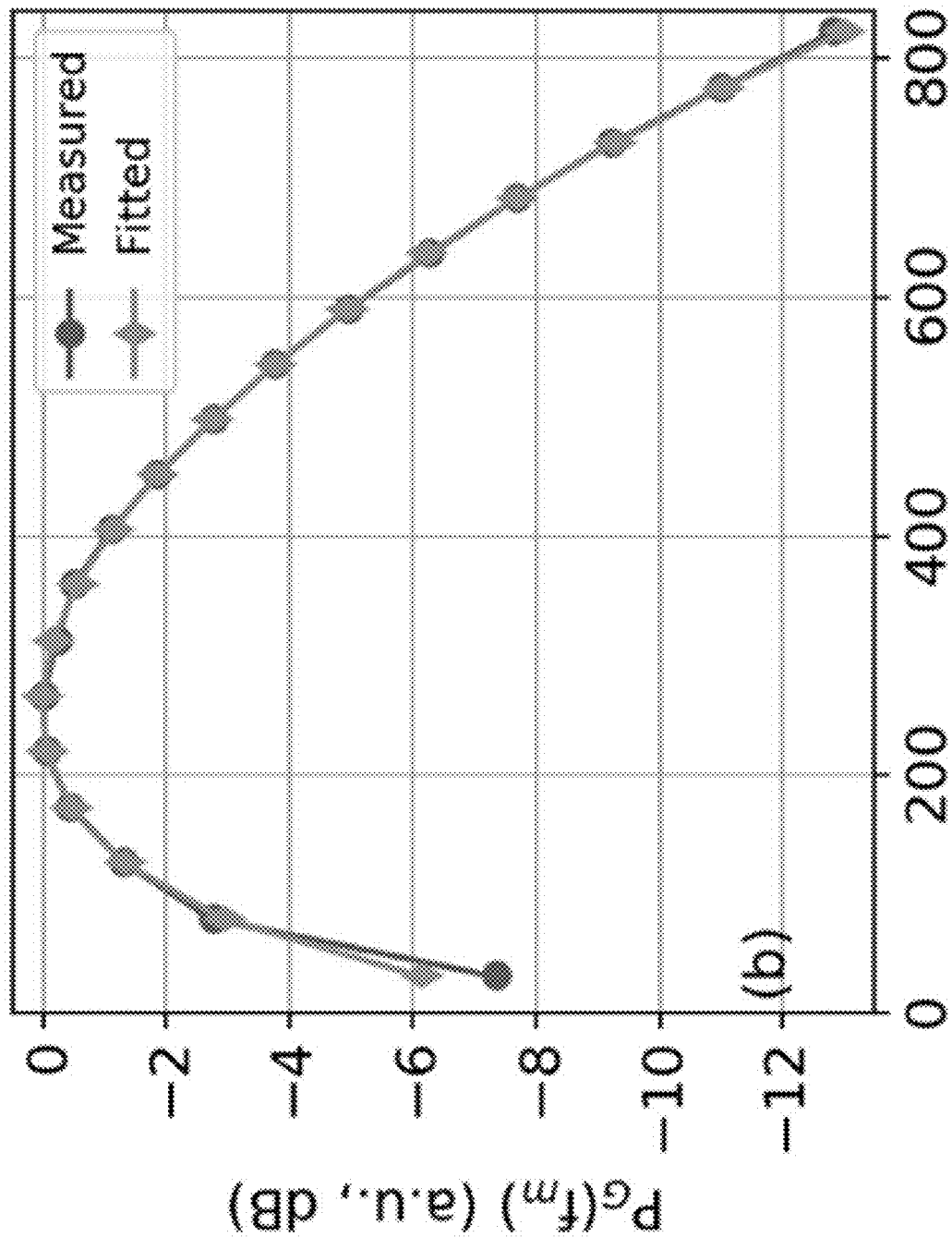

according to aspects of the present disclosure;

FIG. 5 is a plot showing $\Gamma_{mn}$ for a fiber with $$\frac{a}{V_d} = 0.0107 \ s,$$

in dB scale according to aspects of the present disclosure;

FIG. 6 is a plot showing GAWBS spectrum measured for a fiber with 125 diameter, and 112 µm² effective area a schematic diagram according to aspects of the present disclosure;

FIG. 7 is a close-up of a section of FIG. 6 between 500 MHz and 300 MHz according to aspects of the present disclosure;

FIG. 8 is a plot the same as FIG. 6 from ROm modes after removing TR2m peaks according to aspects of the present disclosure;

FIG. 9 is a plot the same as FIG. 8 but each GAWBS peak is fitted with individual Lorentzian shapes according to aspects of the present disclosure;

FIG. 10 is a plot showing a comparison of mode field distribution squared that is recovered from GAWBS measurement and what would be estimated assuming expected mode field distribution squared from a step index doping according to aspects of the present disclosure;

FIG. 11 shows two plots comparing mode field distribution that is recovered from: 60 GAWBS peaks and 25 GAWBS peaks according to aspects of the present disclosure;

FIG. 12 is a plot showing percentage error made in estimating effective area as compared to true effective area as a function of the number of GAWBS peaks used according to aspects of the present disclosure; and FIG. 13(A) and FIG. 13(B) are plots showing GAWBS peaks as a function of frequency for measured and fitted cases in which: FIG. 13(A) is normalized in linear units and FIG. 13(B) is normalized in dB scale according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that one of many telecommunications applications that the present disclosure is particularly applicable to are submarine cables—which are oftentimes referred to as the true backbone of communications in the world. Nearly all of the telecommunications data that crosses continents has to be delivered through submarine cables located on the sea bed. There are several aspects of submarine telecommunications that distinguishes it from other fiber communication systems, 1) they are very long, as they typically connect different continents; 2) it is very expensive to lay cables under water. Once the cable is laid it is extremely expensive to replace, upgrade, or repair the cables. As a result, even small degradations may cause a reduction in available transmission capacity. Since these systems are very expensive to lay and difficult to upgrade it is of course most important to correctly characterize any capacity limitations both simply and accurately.

In optical fibers, the mode field diameter, and therefore the fiber effective area may vary along a same span of a fiber—or it may vary from span to span. As those skilled in the art will appreciate, what matters greatly for overall fiber nonlinear impairment is an average of the effective area, especially if the variation is not too large. As a result, a measurement technique like one according to aspects of the present disclosure—that can measure the average effective area of an entire span, or even the entire transmission length would be preferable to other methods and in sharp contrast to the prior art in which effective area of optical fiber is determined locally, and then averaged over many measurements.

To appreciate the significance of our inventive method according to aspects of the present disclosure, it is useful to review an illustrative undersea optical communications system. As will be understood and appreciated, data to be transmitted over the undersea cable is applied to the cable at a cable located at a point—usually an endpoint—of the optical undersea cable. The data is then delivered to another cable station via an undersea/submarine cable similarly located at an opposite endpoint of the optical cable.

Those skilled in the art will understand and appreciate that typical submarine cables have two parts namely, a cable span and repeaters located at appropriate points along the length of the cable. The cable span can be 40 km to 150 km or longer, but typically in the 50-80 km range.

While cable spans may include several elements, the main component of a span is the optical fiber(s). As is known in the art, optical telecommunications fibers are very thin strands of glass that can guide light with low attenuation. Optical fibers are very thin—about 250 microns diameters typically. Generally, optical fibers are made of pure silica glass and exhibit a cylindrical shape.

Light is guided through a doped center "core" which is surrounded by a cladding. Typically, a core diameter is approximately 5-12 micrometers, and the cladding diameter is approximately 125 micrometers. The glass fiber is further coated by one or more polymers to protect it which results in an overall diameter of approximately 250 micrometers.

Generally—and in particular undersea optical fiber cables—such cables include a plurality of fibers each fiber configured to convey additional data/traffic. When so configured, the data carrying capacity of an optical fiber cable such as an undersea cable is proportional to the number of individual optical fibers comprising the cable.

Since optical fibers comprising an optical cable are very thin, in principle, the capacity of the cable can be increased dramatically by adding more fibers. However, this is not generally the case because of power limitations. While contemporary optical fibers exhibit a low attenuation, the optical power can nevertheless drop to 1% after only 1 span. Accordingly, after a span, signal light conveyed in an optical fiber (undersea cable) is amplified by amplifiers located in repeaters that as we have already noted are located at various points along a length of an undersea cable. In a typical configuration of an undersea cable, there may be one amplifier dedicated to each fiber within a cable. As such, one of the limitations as to the number of fibers that can be supported by a cable system is the number of amplifiers that can be physically located in a repeater as well as the amount of electrical power available at the repeater.

The measurement technique for mode field distribution (MFD) is standardized by ITU-T G650.1 recommendation. According to this recommendation, first the fiber is prepared for measurement. It is stripped of any polymer coating, and then cleaved to produce flat surface. Laser light used in measurement at a desired wavelength exits out of the fiber core at the cleaved surface. Care must be taken to strip unwanted cladding modes before they reach the cleaved surface. The cleaved surface is referred to as the fiber aperture as it acts as the source aperture. If the cladding modes are not stripped effectively, they can affect the measurement accuracy.

A photo-detector is positioned in far-field, oriented towards the center of the fiber core, behind a pin-hole. A schematic of an example of a setup is shown illustratively in FIG. 1.

Figure 1:
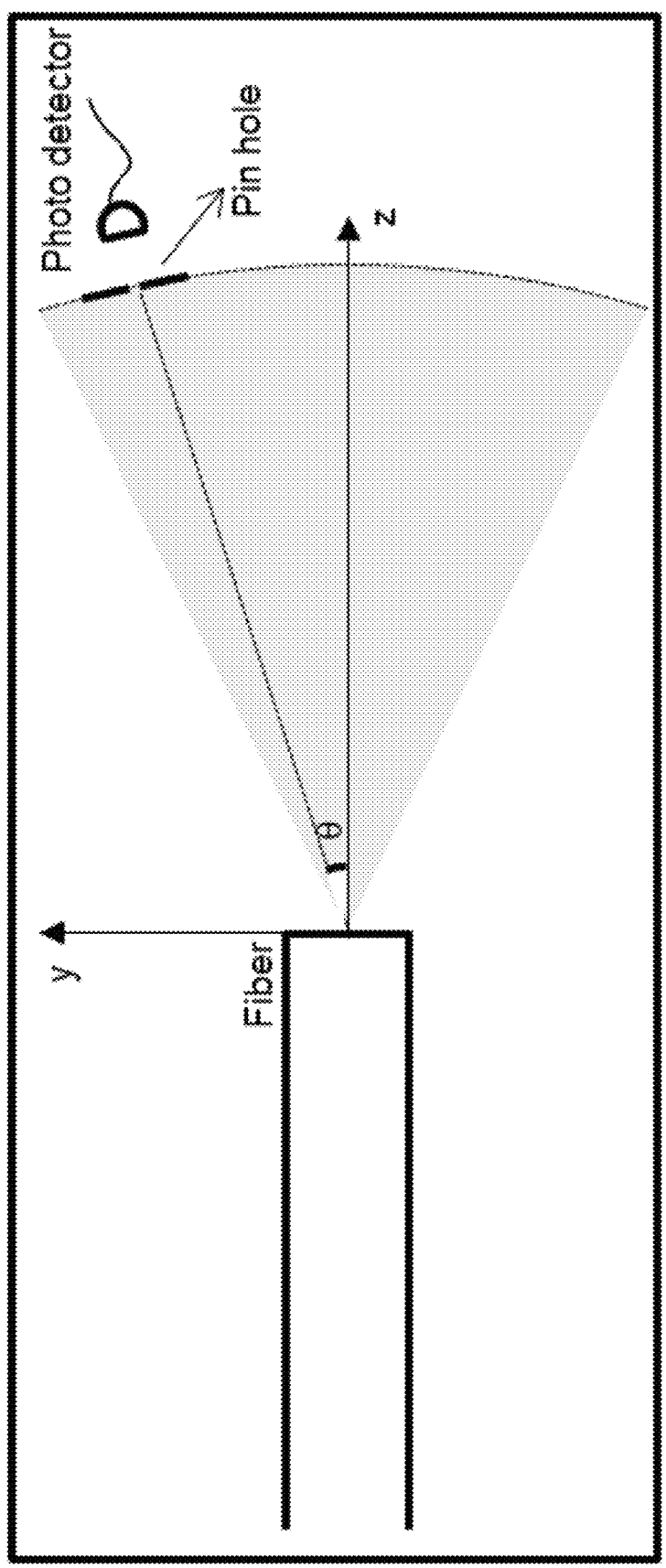
FIG. 1 shows a schematic diagram of a simplified example of a far-field measurement of mode-field using free space optics.

The pin-hole forms an angle θ with respect to the z-axis—which is perpendicular to the fiber aperture. Pin-hole and the photodetector are swept by changing the angle and at each point the optical power is measured by the photodetector. This measurement is called the measurement of the far-field mode distribution. This far-field mode distribution is related back to the mode distribution at the fiber aperture, through a Hankel transform relationship. By calculating the Hankel transform the mode field distribution at the fiber aperture is obtained $$f(r) = c_0 \int_0^\infty \sqrt{I(\theta)} \, J_0\left(\frac{2\pi r \sin(\theta)}{\lambda}\right) \sin(2\theta) d\theta \qquad (1)$$

where f(r) is the mode field distribution near the fiber aperture, also known as the near field, I(θ) is the light intensity measured at the far field by the photodetector shown in FIG. 1, $J_0$ is the zeroth order Bessel function of the first kind, λ is the laser wavelength used for the measurement, $c_0$ is an arbitrary constant showing the relationship is correct up to a constant. From the near field mode distribution, the mode field diameter (MFd), an important parameter of the fiber can be calculated as the root-mean square of the near field distribution as follows:

$$w = \frac{\int_0^\infty |f(r)|^2 r^3 dr}{\int_0^\infty |f(r)|^2 r dr} \quad (2)$$

Note that, ITU-T G650.1 adopted a far field alternative definition of the MFd which is equivalent to Eq. (2) due to properties of Hankel transform as follows:

$$w = \frac{\lambda}{\pi} \left[ \frac{\int_0^{\frac{\pi}{2}} I(\theta) \sin 2\theta d\theta}{\int_0^{\frac{\pi}{2}} I(\theta)(\sin \theta)^3 \cos \theta d\theta} \right]^{\frac{1}{2}} \quad (3)$$

Similarly, the effective are of the fiber defined in terms of the near field mode-field distribution as follows:

$$A_{eff} = 2\pi \frac{\left[\int_0^\infty |f(r)|^2 r dr\right]^2}{\int_0^\infty |f(r)|^4 r dr} \quad (4)$$

At this point however, we note that there exist several problems with this method of measuring mode-field distribution, mode-field diameter, and effective area.

First, the interesting, and physically relevant parameter is the mode-field distribution inside the fiber core. However, this method measures the mode-field distribution just at the fiber/air interface, which as noted above is called the fiber aperture. Even though the resulting mode-field distribution is a relatively good approximation of how the field appears inside the fiber far from the fiber/air interface, nevertheless they are not the same as the field distribution is affected by the interface.

Second, the measurement is a single point measurement. It is assumed that the fiber is uniform, and a measurement at a single point is a good representation of the distribution along a long fiber which of course is not necessarily true in all situations.

Finally, it is cumbersome to prepare the measurement set up. For instance, the fiber polymer coating needs to be removed, and the fiber needs to be cleaved, so that the fiber facet is perpendicular to the fiber axis and flat. Moreover, the measurement axis needs to be centered at the core centered. Even though these can all be handled well with sufficient care, it is still cumbersome and not always reproduceable.

In contrast to the above noted techniques, our inventive method according to aspects of the present disclosure determines mode field distribution, and effective area from accurate measurements of guided-acoustic Brillouin scattering spectrum (GAWBS).

Advantageously, with our inventive method, light always remains in the optical fiber, therefore it measures the optical mode-field distribution inside the fiber, and not at the fiber/air interface, or other perturbation points in the fiber. Therefore, it is a more accurate representation of the optical mode-field distribution in the fiber. Since the light always remain in the fiber, it does not require complicated fiber preparation procedures that are required for measurements that are done in free space. Finally, our inventive method does not measure mode-field distribution at a single point, but it provides the average of the mode-field distribution along the length of the fiber that is measured.

Now we are proposing using GAWBS to estimate the mode-field distribution. Measurement of GAWBS does not require cutting the fiber. It is a representation of the light not at a cut point but inside the fiber.

Figure 2:
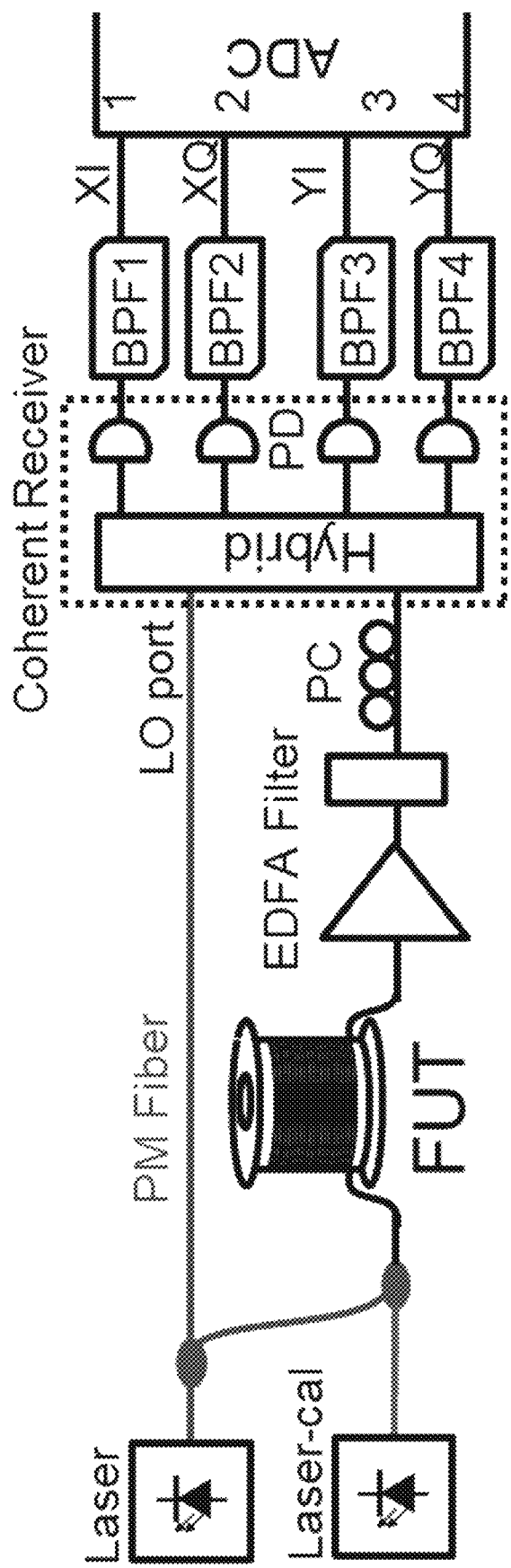
FIG. 2 shows a schematic diagram of an illustrative example for guided acoustic wave Brillouin scattering (GAWBS) according to aspects of the present disclosure.

Another inventive feature is that, many possibilities of the measurement uncertainties does affect the measurement result, as the mode-field distribution only depends on the GAWBS shape and not its absolute value FIG. 2 shows an example of a measurement set up that can be used for measuring GAWBS spectrum. As it can be seen, light always remain in fiber until it reaches the photodetectors. A more detailed description of the measurement method can be found in [IR20011]. A laser is sent through the fiber under test (FUT). In the fiber, there are ever present acoustic waves due to thermal fluctuations. These acoustic waves modulate the refractive index of the glass, in particular the acoustic waves bouncing back and forth between the glass/polymer-coating interface perpendicular to the direction of the light create the GAWBS spectrum. Due to the confining structure of the fiber, these modes presents as modes, called GAWBS modes. These modes modulate the refractive index of the signal, and create side tones at the same frequencies as the acoustic frequencies. These side tones give rise to a spectrum that looks like the cartoon representation shown in FIG. 3.

Figure 3:
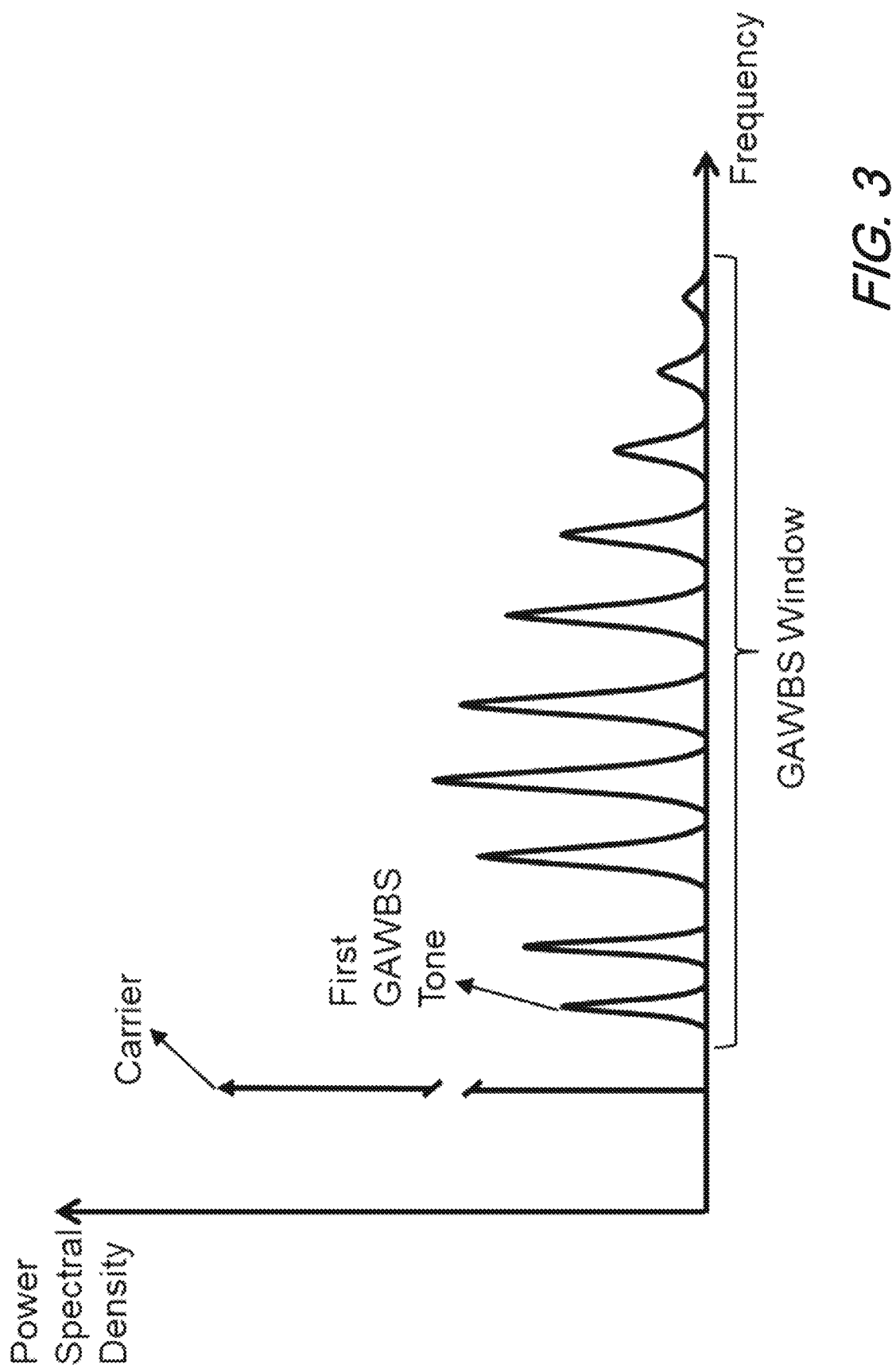
FIG. 3 shows an illustrative plot (not to scale) of Power Spectral Density vs. Frequency GAWBS spectrum wherein a carrier is the laser light sent to a fiber under test (FUT) and the carrier is much larger as compared to GAWBS tones according to aspects of the present disclosure.

As it can be seen in FIG. 3, GAWBS creates discrete frequency peaks. The location of these peaks depend on glass parameters, such as speed of longitudinal, and shear sound waves in glass and fiber cladding diameter. Over all magnitude of the peaks depends on fiber parameters such as, refractive index, glass density, photo-elastic coefficients of the glass, temperature and length of the fiber. Finally, the shape of the spectrum, in other words the relative power levels of the peaks with respect to one another depends only on the optical mode field distribution. Therefore, even if we don't have a good measurement values, or estimates of many of the fiber parameters such the cladding diameter, refractive index, photo-elastic parameters, speed of sound in the glass, temperature, glass density, etc., we can still determine the mode-field distribution from the shape of the spectrum.

Our statement that the spectral shape only depends on the optical mode distribution depends on several assumptions that are well satisfied for many typical fibers, which are 1) The presence of the core does not affect the acoustic mode distribution significantly. In other words the acoustic modes of the fiber remains the almost same whether the fiber has a core in the middle or not. This is well satisfied especially for most typical fibers where the core is only lightly doped, and the refractive index difference between the core and the cladding is small. 2) The polymer coating doesn't impact different acoustic modes too differently. This is also well satisfied for most typical fibers where the glass/polymer coating interface creates a high impedance mismatch for the acoustic mode.

Note that, the GAWBS spectrum measurement gives the location of the peaks which can be used as an additional means to increase the accuracy of the measurements. For instance, even though the speed of sound is well documented in the fiber, and the cladding diameter is typically well known, one can eliminate one of these parameters which may have the lower confidence based on the exact measured spectral locations of the GAWBS peaks.

Under these assumptions, each peak can be easily identified as originating from which particular acoustic mode. The shape of the acoustic modes can be calculated from the fiber parameters as it will discussed next.

GAWBS is generate by transverse acoustic modes in the fiber. These modes do not have any longitudinal components, which means they only generate forward scattering. The acoustic frequencies allowed by a given fiber can be found through solving the following characteristic equation for y [6]

$$|B|=0 \quad (5)$$

where $|\cdot|$ stands for determinant and B is 2×2 matrix given by $$\left(n^2 - 1 - \frac{y^2}{2}\right) J_n(\alpha y)\left(n(n^2 - 1) - \frac{y^2}{2}\right) J_n(y) - \quad (6)$$
$$(n^2 - 1) y J_{n+1}(y)(n-1) J_n(\alpha y) -$$
$$\alpha y J_{n+1}(\alpha y)\left(n(n-1) - \frac{y^2}{2}\right) J_n(y) + y J_{n+1}(y)$$

where $y=2\pi f\alpha/V_s$, $\alpha=V_s/V_d$, $V_s$ is the shear sound velocity, $V_d$ is the longitudinal sound velocity, and f is the vibration frequency sound wave, a is the fiber cladding radius, and n is an integer that denotes solutions for different acoustic mode groups. For each n, Eqs. (5-6) has discrete solutions that can be numbered with integers m. The acoustic modes can be described by the displacement vector fields for these modes which are given by:

$$U_r(r, t) = \quad (7)$$
$$C_{nm} \frac{y_{nm}}{a}\left\{-A_2\left[\frac{an}{r} J_n\left(\frac{\alpha y_{nm} r}{a}\right) - \alpha J_{n+1}\left(\frac{\alpha y_{nm} r}{a}\right)\right] + A_1 \frac{na}{r} J_n\left(\frac{y_{nm} r}{a}\right)\right\}$$
$$\cos(n\varphi) \sin(\Omega_{nm} t)$$

$$U_\varphi(r, t) = C_{nm} \frac{y_{nm}}{a}\left\{-A_1\left[\frac{an}{r} J_n\left(\frac{y_{nm} r}{a}\right) - J_{n+1}\left(\frac{y_{nm} r}{a}\right)\right] + A_2 \frac{na}{r} J_n\left(\frac{\alpha y_{nm} r}{a}\right)\right\}$$
$$\sin(n\varphi) \sin(\Omega_{nm} t)$$

where $A_1=nB_{11}$, $A_2=B_{12}$, $U=[U_r, U_\varphi, 0]$ is the displacement vector field in cylindrical coordinates defined by radial, and angular coordinates r and $\varphi$, respectively, and $C_{nm}$ is the amplitude of the corresponding mode, $\Omega_{nm}=2\pi f_{nm}$, $f_{nm}$ are the discrete frequencies that satisfy the characteristic equation given by Eq. (6). Note that we may drop the time dependent portion when not relevant.

The acoustic vibrations cause a strain tensor in the cross plane of the fiber which in turn creates modulation of the refractive index of the fiber. The non-zero strain tensor components can be found by the following relations:

$$S_{rr} = \frac{\partial U_r}{\partial r} \quad (8)$$

$$S_{\varphi\varphi} = \frac{1}{r} \frac{\partial U_\varphi}{\partial \varphi} + \frac{U_r}{r}$$

$$S_{r\varphi} = \frac{1}{2}\left(\frac{1}{r} \frac{\partial U_r}{\partial \varphi} + \frac{\partial U_\varphi}{\partial r} - \frac{U_\varphi}{r}\right)$$

Note that tensor components in z axis is zero. Inserting Eq (7) into Eq (8), we get the following:

$$S_{rr} =$$
$$C_{nm}\left(\frac{y_{mn}}{a}\right)^2 \left\{-A_2\left[\frac{n(n-1)}{\rho^2} J_n(\alpha\rho) - \frac{(2n+1)\alpha}{\rho} J_{n+1}(\alpha\rho) + \alpha^2 J_{n+2}(\alpha\rho)\right] + A_1\left[\frac{n(n+1)}{\rho^2} J_n(\rho) - \frac{n}{\rho} J_{n+1}(\rho)\right]\right\} \cos n\varphi$$

$$S_{\varphi\varphi} = C_{nm}\left(\frac{y_{mn}}{a}\right)^2 \frac{1}{\rho}\left\{A_2\left[\frac{n}{\rho} J_n(\alpha\rho) + \alpha J_{n+1}(\alpha\rho)\right] - A_1\left[\frac{n}{\rho} J_n(\rho) - 2J_{n+1}(\rho)\right]\right\} \cos n\varphi$$

$$S_{r\varphi} = C_{nm}\left(\frac{y_{mn}}{a}\right)^2 \frac{1}{2\rho}\left\{A_2\left[\frac{n^2}{\rho} J_n(\alpha\rho) - (n-2)\alpha J_{n+1}(\alpha\rho)\right] - A_1\left[\frac{n^2}{\rho} J_n(\rho) - 2n J_{n+1}(\rho) + \rho J_{n+2}(\rho)\right]\right\} \sin n\varphi$$

where $\rho=y_{nm}r/\alpha$. In order to find the level of change in the refractive index due to the strain induced by the acoustic vibrations we use the photo-elastic relation for isotropic materials in the reduced notation that relates the strain tensor to the impermeability tensor as follows which is given in the Cartesian coordinates as follows.

$$\begin{bmatrix} \Delta\eta_{xx}(r,\varphi) \\ \Delta\eta_{yy}(r,\varphi) \\ \Delta\eta_{zz}(r,\varphi) \\ \Delta\eta_{yz}(r,\varphi) \\ \Delta\eta_{xz}(r,\varphi) \\ \Delta\eta_{xy}(r,\varphi) \end{bmatrix} = \begin{bmatrix} p_{11} & p_{12} & p_{12} & 0 & 0 & 0 \\ p_{12} & p_{11} & p_{12} & 0 & 0 & 0 \\ p_{12} & p_{12} & p_{11} & 0 & 0 & 0 \\ 0 & 0 & 0 & p_{11}-p_{12} & 0 & 0 \\ 0 & 0 & 0 & 0 & p_{11}-p_{12} & 0 \\ 0 & 0 & 0 & 0 & 0 & p_{11}-p_{12} \end{bmatrix} \quad (10)$$

$$\begin{bmatrix} S_{xx}(r,\varphi) \\ S_{yy}(r,\varphi) \\ S_{zz}(r,\varphi) \\ S_{yz}(r,\varphi) \\ S_{xz}(r,\varphi) \\ S_{xy}(r,\varphi) \end{bmatrix}$$

where $$\Delta\eta_{ab}(r, \varphi) = \Delta\left(\frac{1}{\varepsilon_{ab}(r,\varphi)}\right) \approx -\frac{\Delta\varepsilon_{ab}(r,\varphi)}{\varepsilon_{ab}^2} \quad (11)$$

and $\varepsilon_{ab}$ are the components of the dielectric permittivity tensor, and the approximation on the right holds for small changes in the dielectric permittivity as is the case for GAWBS. From Eq.(10) we obtain $$\Delta\eta_{xx}(r, \varphi) = p_{11} S_{xx} + p_{12} S_{yy} \quad (12)$$
$$\Delta\eta_{yy}(r, \varphi) = p_{12} S_{xx} + p_{11} S_{yy}$$
$$\Delta\eta_{xy}(r, \varphi) = (p_{11} - p_{12}) S_{xy}$$

We can write the strain tensor from the Cartesian coordinates to the cylindrical coordinates as follows $$S_{xx} = (\cos\varphi)^2 S_{rr} + (\sin\varphi)^2 S_{\varphi\varphi} - \sin 2\varphi S_{r\varphi} \quad (13)$$
$$S_{yy} = (\sin\varphi)^2 S_{rr} + (\cos\varphi)^2 S_{\varphi\varphi} + \sin 2\varphi S_{r\varphi}$$
$$S_{xy} = \sin 2\varphi (S_{rr} - S_{\varphi\varphi})/2 - \cos 2\varphi$$

Inserting Eq.(13) into Eq.(12) we can write the impermeability tensor components as follows:

$$\Delta\eta_{xx}(r, \varphi) = \quad (14)$$
$$\frac{p_{11} + p_{12}}{2}(S_{rr} + S_{\varphi\varphi}) + \frac{p_{11} - p_{12}}{2}[(S_{rr} - S_{\varphi\varphi})\cos 2\varphi - 2S_{r\varphi}\sin$$

$$\Delta\eta_{yy}(r, \varphi) =$$
$$\frac{p_{11} + p_{12}}{2}(S_{rr} + S_{\varphi\varphi}) - \frac{p_{11} - p_{12}}{2}[(S_{rr} - S_{\varphi\varphi})\cos 2\varphi - 2S_{r\varphi}\sin$$

$$\Delta\eta_{xy}(r, \varphi) = \frac{p_{11} - p_{12}}{2}[(S_{rr} - S_{\varphi\varphi})\sin 2\varphi - 2S_{r\varphi}\cos 2\varphi]$$

Note that the expression for $\Delta\eta_{ab}(r, \varphi)$ can be separated into two parts each of which only depends on r or cp. This can be noted by looking at Eq. (14) where the terms dependent on $\varphi$ are explicit, and moreover, it is clear from Eq. (9) that the strain tensor components can be separated into two parts that only depends on r or $\varphi$. We will do this more explicit by doing the following definition:

$$S_{rr}(r, \varphi) = s_{rr}(r)\cos 2\varphi \quad (15)$$
$$S_{\varphi\varphi}(r, \varphi) = s_{\varphi\varphi}(r)\cos 2\varphi$$
$$S_{r\varphi}(r, \varphi) = s_{r\varphi}(r)\sin 2\varphi$$

We will eventually relate the changes in the permeability tensor to the refractive index changes. Eq. (14) describes how the impermeability tensor components vary across the fiber cross section due to the acoustic vibrations. In general, such spatial variations in the refractive index distribution would scatter the signal travelling in the fiber into all the modes supported by the optical fiber and radiation modes. When the index modulations are very small, power lost these scattering would be negligible, and not of interest to us. The non-negligible contribution would be to optical signal coupling into the modes supported by the fiber in the absence of acoustic vibrations. Though this analysis can be extended to multi-mode fibers, here we will limit the analyses to single moded fibers. In this case the available modes are the two orthogonal polarization modes. We can expand the optical field in these two modes as follows:

$$\vec{E}(r,z,t) = f(r)[h_x(z)\hat{e}_x + h_y(z)\hat{e}_y]e^{-i(kz-\omega t)} \quad (16)$$

In Eq. (16) we expanded the electric field of the optical mode in terms of the two polarization modes aligned along the unit vectors $\hat{e}_x$ and $\hat{e}_y$. Here the assumption is that the fiber is single moded with a propagation constant of $k = n_0 k_0 = 2\pi n_0/\lambda$, where $n_0 = \sqrt{\varepsilon}$ is the refractive index of the fiber without the acoustic perturbation, and E is the corresponding dielectric permittivity, and $k_0$ is the.

Fiber's intrinsic anisotropy is neglected, and same propagation constant is assumed for both polarization modes. Moreover, it is assumed that both polarizations have the same mode field distribution in the transverse direction f(r). Note that, in Eq. (16), the longitudinal component of the optical mode is not included even though in general it is not zero, even though it is typically small. This is warranted as the z-components of the permeability tensors vanish anyways since the acoustic modes we are looking are transverse modes. However, because of the acoustic vibrations, the evolution of the two polarizations along the fiber, i.e., in the z-axis is given by two separate functions, which allows for coupling of the two polarizations components to one another as well back to themselves. The coupled mode equations for the optical mode can be written as follows:

$$\frac{\partial h_a(z)}{\partial z} = i \sum_{b=x,y} \kappa_{ij} h_j(z), \quad a = x, y, \quad i = \sqrt{-1} \quad (17)$$

where the coupling coefficients $K_{ij}$ are given by [7]

$$\kappa_{ab} = \frac{k_0}{2\sqrt{\varepsilon}} \frac{\int_0^{2\pi}\int_0^{\infty} \Delta\varepsilon_{ab}(r, \varphi) f(r)^2 r\, dr\, d\varphi}{\int_0^{2\pi}\int_0^{\infty} f(r)^2 r\, dr\, d\varphi} \quad a, b = x, y \quad (18)$$

Eq. (17) is a central equation to our disclosure. One can see that the coupling coefficients are just a normalized overlap integral between the optical mode field distribution and the strain distribution caused by the acoustic vibrations. Since we know the strain distribution generated by the acoustic vibrations as shown in Eq.(9), although we would know their overlap with the optical mode field.

We can rewrite Eq.(18) as follows by using the definition in Eq.(15)

$$\kappa_{xx} \propto p_p \int_0^{2\pi} \cos(n\varphi)d\varphi \int_0^{\infty}(s_{rr}+s_{\varphi\varphi})f(r)^2 dr + \quad (19)$$
$$p_m \int_0^{2\pi} \cos(n\varphi)\cos(2\varphi)d\varphi \int_0^{\infty}(s_{rr}-s_{\varphi\varphi})f(r)^2 dr +$$
$$2p_m \int_0^{2\pi} \sin(n\varphi)\sin(2\varphi)d\varphi \int_0^{\infty} s_{r\varphi}f(r)^2 r\, dr$$

$$\kappa_{yy} \propto p_p \int_0^{2\pi} \cos(n\varphi)d\varphi \int_0^{\infty}(s_{rr}+s_{\varphi\varphi})f(r)^2 r\, dr - \quad (20)$$
$$p_m \int_0^{2\pi} \cos(n\varphi)\cos(2\varphi)d\varphi \int_0^{\infty}(s_{rr}-s_{\varphi\varphi})f(r)^2 r\, dr$$
$$-2p_m \int_0^{2\pi} \sin(n\varphi)\sin(2\varphi)d\varphi \int_0^{\infty} s_{r\varphi}f(r)^2 r\, dr$$

$$\kappa_{xy} \propto p_m \int_0^{2\pi} \cos(n\varphi)\sin(2\varphi)d\varphi \int_0^{\infty}(s_{rr}-s_{\varphi\varphi})f(r)^2 r\, dr - \quad (21)$$
$$2p_m \int_0^{2\pi} \sin(n\varphi)\cos(2\varphi)d\varphi \int_0^{\infty} s_{r\varphi}f(r)^2 r\, dr$$

where $p_p = (p_{11}+p_{12})/2$, and $p_m = (p_{11}-p_{12})/2$, and only the integration in numerator in Eq. (18) is shown as the integral in denominator just a normalization factor by the total power in the optical mode. We can see that in Eq. (21), which creates coupling between the two polarizations, all the integrals over $\varphi$ (angular integrals) vanishes for any integer n. This is only true when we choose the x- and y-polarizations in the same axis defined by the angle $\varphi$.

Angular integrals in Eq. (19-20) do not vanish only for two values of n: n=0, and n=2. For n=0, the angular integrals in the first terms on the right is just $2\pi$ as the cosine term is just 1, for both Eqs. (17) and (18). However, the angular integrals in the second and third terms vanish. For the case of n=2, the first terms on the right vanish, and the second and third angular integrals are just $\pi$. Therefore we can simplify Eqs. (19-20) as follows $$n = 0: \kappa_{yy} = \kappa_{xx} = \kappa_p = \frac{k_0 n_0^3}{2} \frac{p_p \int_0^\infty (s_{rr} + s_{\varphi\varphi}) f(r)^2 r dr}{\int_0^\infty f(r)^2 r dr} \quad (22)$$

$$n = 2: -\kappa_{yy} = \kappa_{xx} = \kappa_u = \frac{k_0 n_0^3}{4} \frac{p_m \int_0^\infty (s_{rr} - s_{\varphi\varphi} + 2s_{r\varphi}) f(r)^2}{\int_0^\infty f(r)^2 r dr}$$

where we used the approximation in Eq. (11) and the definition $n_0 = \sqrt{\varepsilon}$.

Combining Eqs. (16,17, and 20) we realize the following:

$$n = 0: \vec{E}(r, z, t) = f(r)[h_x(0)\hat{e}_x + h_y(0)\hat{e}_y] e^{-i(kz-\omega t)} e^{i\kappa_p(t)z} \quad (23)$$

$$n = 2: \vec{E}(r, z, t) = f(r)\left[h_x(0) e^{i\kappa_u(t)z} \hat{e}_x + h_y(0) e^{-i\kappa_u(t)z} \hat{e}_y\right] e^{-i(kz-\omega t)}$$

We can observe from Eq. (23) that in the case of n=0, optical field only experiences a phase modulation since the phase shift is the same for both polarizations. Therefore, the GAWBS peaks created by n=0 mode group which is also denoted as the $R_{0m}$ modes create only GAWBS peaks that are in the same polarization as the input optical field. Incidentally, these modes are called the radial modes, as they only generate vibrations in the form of radial dilation, and contraction.

For the case of n=2, optical field experiences linear birefringence, in particular when the optical field has equal power in both x- and y-polarizations defined by the angle $\varphi$, the field experiences pure birefringence, and therefore GAWBS peaks occur orthogonal to the input optical field. When the input field is only in x-polarization or only in y-polarization, then the optical field again experience only a pure phase modulation. Therefore since in general the optical field polarization may be in random orientation, GAWBS peaks of both polarizations are created. These GAWBS peaks are also known as unpolarized GAWBS. Nevertheless, as we will show later that unpolarized does not mean zero degree of polarization. The acoustic mode group of n=2 is also given the name $TR_{2m}$, known as torsional-rotational modes.

In Eq. (23), we explicitly retain the time dependence of the coupling coefficients, since these coefficients are created by acoustic modes vibrating at frequencies. These frequencies can be found from Eq.(6) where n=0, $$\left[\frac{y^2}{2} J_0(y) - y J_1(y)\right] \left[\frac{y^2}{2} J_0(\alpha y) - \alpha y J_1(\alpha y)\right] = 0 \quad (24)$$

which gives two separate equations. The solutions of the equation in the first parenthesis belong to the mode group that is pre radial shear waves. Incidentally, the equation in the first parenthesis can be reduced to roots of the second order Bessel function. Shear waves do not contribute to GAWBS. This is because pure shear waves $U_r=0$, and, $U_\varphi(r)$ is a function of r only. Therefore it only produces off-diagonal strain, i.e., $S_{r\varphi}$ with no $\varphi$ dependence. Looking at Eqs. (19-21) all the angular integrals would vanish under these conditions.

The solution to the equation in the second parenthesis belong to the pure radial dilational modes. We can find the acoustic frequencies satisfying this equation by relating them to the $\alpha y_{0m}$ that satisfied this equation as follows:

$$f_{0m} = \frac{y_{0m} V_d}{2\pi \alpha} \quad (25)$$

where we used $$y = \frac{2\pi f \alpha}{y_s}, \alpha = V_s/V_d$$

The frequencies of the $TR_{2m}$ modes can also be find in a similar fashion from Eq. (6) by setting n=2.

If the fiber core is concentric with the fiber cladding, only two mode groups contributes to the generation of the GAWBS spectrum: n=0 which is responsible for the so called-radial modes $R_{0m}$, and :n=2, which is responsible for the torsional-rotational modes $TR_{2m}$. Therefore we find that the acoustic modes vibrate at discrete frequencies, which in turn, generates strain in the fiber cross-section, and that in turn generates perturbation in the dielectric tensor, which causes coupling as shown in Eqs. (22-23). Since the coupling coefficients vary sinusoidally, they create side tones at the vibration frequencies. To find the magnitude of these side tones, We use Eq. (23), and show the time dependence portion explicitly:

$$n = 0: \vec{E}(r, l, t) = f(r)[h_x(0)\hat{e}_x + h_y(0)\hat{e}_y] e^{-i(kl-\omega t)} e^{i\kappa_{p0} l \sin(\Omega_{0m} t)} \quad (26)$$

$$n = 2: \vec{E}(r, l, t) = f(r)\left[h_x(0) e^{i\kappa_{u0} l \sin(\Omega_{2m} t)} \hat{e}_x + h_y(0) e^{-i\kappa_{u0} l \sin(\Omega_{2m} t)} \hat{e}_y\right] e^{-i}$$

where we inserted the time dependence of the acoustic vibrations explicitly, assumed a short propagation length of l, and defined $\kappa_{p0}$, and $\kappa_{u0}$ as the maximum amplitude of the acoustic vibrations. Moreover, we ignored any additional phase in the time variation for simplicity. The time dependent term can be expanded using Bessel identity:

$$e^{i\kappa_{p0} z \sin(\Omega_{0m} t)} = \Sigma v_{=-\infty}^\infty J_v(\kappa_{p0} z) e^{i\kappa_{p0} z \Omega_{0m} t} \approx 1 + i\kappa_{p0} l \sin(\Omega_{0m} t) \quad (27)$$

where we assumed a short distance where $\kappa_{p0} z \ll 1$. Equation(27) shows the amplitude of the side tones generated at the frequency $f_{0m}$. A similar expansion can be made for the $TR_{2m}$ modes. The average power of the GAWBS tones per unit length=can be found to be:

$$P_G(f_{0m}) = P_0 \langle |i\kappa_{p0} \sin(\Omega_{0m} t)|^2 \rangle_t = P_0 \frac{(\kappa_{p0})^2}{2} l_c \quad (28)$$

where $\langle \cdot \rangle_t$ stands for time averaging, $P_G(f_{0m})$ is defined as the generated GAWBS power as a function of the GAWBS peak frequency per unit length, $P_0$ is the incident power, $l_c$ is the coherence length of the acoustic modes in the z-axis. $l_c$ is introduced without derivation. So far in the derivation, we assumed the acoustic modes have infinite wavelength in the z-axis, meaning the entire length of the fiber is vibrating coherently. However, this is not the case, and $l_c$ is assumed to be the length scale at which acoustic modes on average loosened their coherence along the fiber.

Note that a similar analysis can be made for the $TR_{2m}$ modes, however, as it can be seen from Eq. (26), these modes do not generate a pure phase modulation. Therefore, the GAWBS peaks will be generated at different polarizations.

First, we need to find out how these peaks are distributed among different polarizations. Using the approximation in Eq.(27), we can write the field for n=2 in Eq.(26) as follows:

$$\vec{E}(r,l,t)=f(r)e^{-i(kl-\omega t)}\{[h_x(0)\hat{e}_x+h_y(0)\hat{e}_y]-i\kappa_{u0}l\sin(\Omega_{2m}t)$$
$$[h_x(0)\hat{e}_x-h_y(0)\hat{e}_y]\} \quad (29)$$

Without loss of generality, we assume the following form $$h_x(0)=A\cos(\theta/2)e^{i\psi}, \text{ and } h_x(0)=A\sin(\theta/2) \quad (30)$$

where $\theta \in [0,\pi]$, $\psi \in [0, 2\pi]$ are arbitrary angles, and A is a complex amplitude, which can describe an arbitrary polarization of the optical field. Note that we are still assuming $\hat{e}_x$ and $\hat{e}_y$ are aligned in the reference frame defined by angle $\varphi$, which describes the angular dependence of the $TR_{2m}$ modes. We note that in Eq. (29), the term in the first square brackets is the original incident field, and the second term is the scattered GAWBS field. The GAWBS term is not necessarily parallel, or orthogonal to the incident optical field. We can separate it into two parts, one part parallel to that of the incident field, and one part orthogonal as follows:

$$[\cos(\theta/2)e^{i\psi}\hat{e}_x - \sin(\theta/2)\hat{e}_y] = \quad (31)$$
$$\cos(\theta)[\cos(\theta/2)e^{i\psi}\hat{e}_x + \sin(\theta/2)\hat{e}_y] + \sin(\theta)[\sin(\theta/2)e^{i\psi}\hat{e}_x - \hat{e}_y\cos(\theta/2)]$$

In Eq.(31), the first term on the right is parallel to the incident optical field, and the second term is orthogonal. Equation (31) shows that, when $\theta=0$, meaning the incident optical field is along the x-axis, or when $\theta=\pi$, meaning the incident field is along the y-axis, the GAWBS peaks are fully aligned with the incident optical field. However, for any other value of $\theta$, there is non-zero contribution in orthogonal polarization.

Note that the ellipticity angle $\psi$ plays no role. Moreover, when $$\theta = \frac{\pi}{2},$$

GAWBS peaks are completely in orthogonal polarization to the incident field. Again this true regardless of the value of the ellipticity angle.

Note that in general the orientation of the incident optical field with respect to the reference frame of the acoustic modes is arbitrary, and it changes randomly along the fiber due to residual birefringence in fibers. Therefore we need to average the portion of the power of GAWBS that is parallel to the incident field $\sim(\cos(\theta))^2$ and that is orthogonal to the incident field $\sim(\sin(\theta))^2$, over the range of angles $$\frac{1}{4\pi}\int_0^{2\pi}d\psi\int_0^{\pi}(\cos(\theta))^2\sin(\theta)d\theta = \frac{1}{3}, \quad (32)$$
$$\frac{1}{4\pi}\int_0^{2\pi}d\psi\int_0^{\pi}(\sin(\theta))^2\sin(\theta)d\theta = \frac{2}{3}$$

We see from Eq. (32) that, on average, a third of the GAWBS power generated by $TR_{2m}$ modes will be parallel to the incident optical field, and two thirds will be orthogonal to it. In other words, The "unpolarized GAWBS" peaks will have twice as much power orthogonal to the incident field as they will have parallel to it. Even though they are called unpolarized, it should be understood as not-polarized, rather than completely depolarized.

The significance of being able to separate the parallel and orthogonal contributions of GAWBS is that, it helps identifying the GAWBS peaks. Some of the GAWBS peaks generated by $R_{0m}$ and peaks generated by $TR_{2m}$ overlap in frequencies. However, we just showed that $R_{0m}$ peaks do not contribute to orthogonal polarization. Therefore, one can measure both parallel, and orthogonal GAWBS peaks, and then subtract half of the orthogonally polarized GAWBS peaks from the parallel polarized peaks, to leave only parallel GAWBS peaks. This would remove all the $TR_{2m}$ contributions from the parallel GAWBS peaks whether the peak frequencies overlap or not.

Finally, the only remaining free parameter that is not determined so far is the $C_{mn}$ coefficients which also determined the shape of the GAWBS spectrum. In the absence of external drivers, the acoustic modes are excited by ambient thermal fluctuations. In steady state conditions, the equipartition theorem dictates that each acoustic mode equally shares the thermal energy which is equal to $k_BT$, where $k_B$ is the Boltzmann constant, and T is temperature in Kelvin. We can determine the $C_{mn}$ by calculating the energy of each acoustic mode as follows:

$$E_{mn}=\int_0^1\int_0^{2\pi}\int_0^{\alpha}\tfrac{1}{2}\rho\Omega_{mn}^2[U_r^2(r,\varphi)+U_\varphi^2(r,\varphi)]$$
$$rdrd\varphi dz=k_BT \quad (33)$$

where $\rho$ is the glass density. For the case of n=0, we get:

$$C_{0m} = \frac{\alpha}{y_{0m}V_dA_2}\left[\frac{k_BT}{\pi l\rho B_{0m}}\right]^{\frac{1}{2}} \text{ with} \quad (34)$$

$$B_{0m} = \frac{J_0^2(y_{0m})+J_1^2(y_{0m})}{2} - \frac{J_0(y_{0m})J_1(y_{0m})}{y_{0m}}$$

We can see from Eq. (34) that even though all acoustic modes have the same energy, they have varying magnitudes. Putting Eqs.(9,22,25,28) together we get $$P_G(f_{0m}) = C_0\left[\int_0^1 s(\beta_m x)f^2(x)xdx\right]^2 \text{ where} \quad (35)$$

$$C_0 = \frac{P_0k_0n_0^3p_p}{2\alpha V_d l_c \int_0^1 f(x)^2 xdx}\sqrt{\frac{k_BT}{\pi l\rho}}, \quad (36)$$

$$s(\beta_m x) = \frac{J_0(\beta_m x)}{\sqrt{J_1^2(\beta_m)-J_0(\beta_m)J_2(\beta_m)}}, \beta_m = \Omega_{0m}\frac{\alpha}{V_d}$$

We see from Eq. (35) that the GAWBS spectrum is of the form of square of series expansion of the square of mode field distribution $f^2(X)$, where the basis functions are proportional to the strain from the acoustic modes given by $s(\beta_m x)$, and. Note that $C_0$ contains bunch of constants of the fiber parameters that do not affect the spectral shape, but only the overall amplitude. In fact, this series expansion would be identical to a Hankel series transform of the zeroth order, since $s(\beta_m x)=J_0(\beta_m x)$, however it is not since $\beta_m$ are not roots of Bessel function of the zeroth order but, e.g., $J_0(\beta_m)=0$, but satisfies Eqn. (24).

Figure 4:
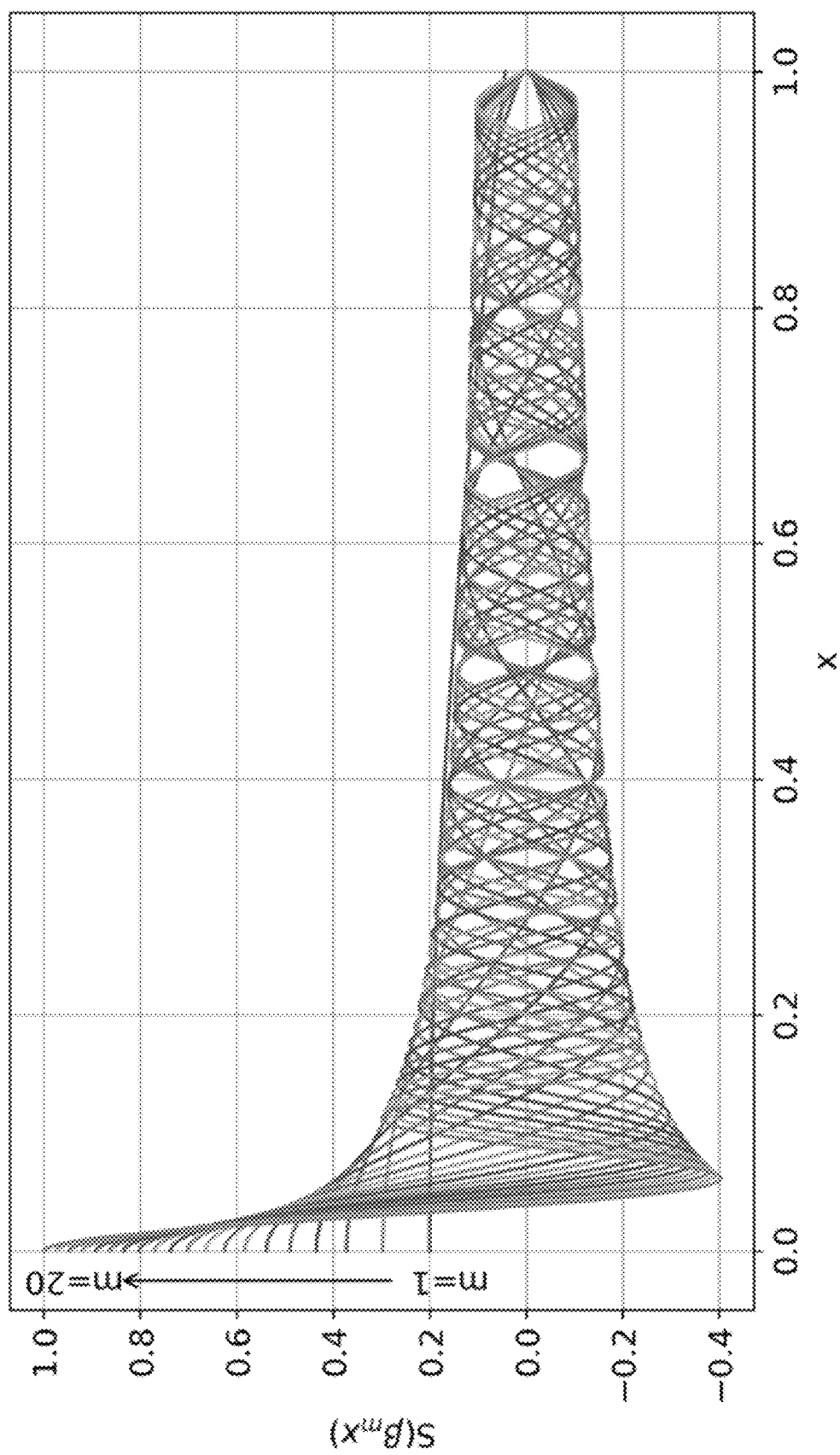
FIG. 4 is a plot showing $s(\beta_m x)$ for the first 20 $R_{0m}$ modes, for a fiber with $$\frac{a}{V_d} = 0.0107 \ s$$

FIG. 4 shows the strain $s(\beta_m x)$ from the first 20 $R_{0m}$ modes as a function of the normalized radius $x=r/\alpha$. As it was mentioned earlier these functions are not orthogonal since $J_0(\beta_m)=0$ is not satisfied, however, one can see that at $x=1$, they almost vanish except for the first few modes, showing that, even they are not exactly orthogonal, they are close to orthogonal. Therefore, it is possible to orthogonalize them through any of the many orthogonalization procedures, Gram-Schmidt being the most well-known, without much issues. To see the level of orthogonality among the strain functions we can calculate:

$$\Gamma_{mn}=\int_0^1 s(\beta_m x)s(\beta_n x)xdx \qquad (37)$$

FIG. 5 shows $\Gamma_{mn}$ in dB scale. It shows that the strain functions are nearly orthogonal, especially for higher order modes. After measuring GAWBS peaks for modes 1 to N, we can calculate the strain functions $s(\beta_m x)$ that corresponds to these N modes. Next, we can use Gram-Schmidt orthogonalization to obtain a new orthogonal set of functions we will call $g_n(x)$. Since the strain functions are nearly orthogonal, there will be N orthogonal basis. Finally, we can obtain square of the mode field distribution up to a constant factor by the following equation:

$$f^2(x)=\Sigma_{m=1}^N \tilde{P}_G(f_m)g_m(x), \tilde{P}_G(f_m)=\Sigma_{n=1}^N \tilde{\mu}_{nm}\sqrt{P_G(f_m)} \qquad (38)$$

where $\mu_{nm}$ are the elements of the 2×2 matrix that is the inverse of the matric M with elements $\mu_{nm}$ defined as:

$$\mu_{nm}=\int_0^1 s(\beta_m x)g_n(x)xdx \qquad (39)$$

To re-iterate, Eq. (38) shows that the magnitude of the mode field diameter distribution can be obtained up to a constant from the measured GAWBS spectrum. Here $P_G(f_m)$ is the measured quantity, $g_m(x)$ is obtained from the strain functions $S(\beta_m x)$ through Gram-Schmidt orthogonalization, or similar method. The strain functions depend only on $$\beta_m = \Omega_{0m}\frac{\alpha}{V_d},$$

where $\Omega_{0m}$ is also obtained from the measurement. Therefore, the uncertainty in the ratio $$\frac{\alpha}{V_d}$$

is the only source of uncertainty in fiber parameters that enters into the estimation of the mode-field diameter. Both of these parameters are typically very well-known and, the glass diameter is typically a very well controlled parameter. Note that in Eq. (24) the equation satisfied by the second parenthesis, which gives the solutions for the frequencies of the $R_{0m}$ modes can be expressed in terms of $\beta_m$ as follows $$\frac{\beta_m}{2\alpha^2}J_0(\beta_m)-J_1(\beta_m)=0 \qquad (40)$$

At the first glance it may look like $\beta_m$ also depends on $\alpha$, which is true, however, note that, we can measure GAWBS peaks due to the $TR_{2m}$ modes, whose peak locations also depend on $\beta_m$ and $\alpha$.

Therefore, we can determine the $\alpha$ parameter by comparing the peak locations of the GAWBS peaks originating from the $R_{0m}$ and $TR_{2m}$ modes. Which leaves the fiber radius as the only free parameter. In other words, if the glass radius is overestimated by 10%, the mode field diameter will be overestimated by 10%.

FIG. 6 shows an example of a GAWBS spectrum measured for a fiber with 125 μm cladding diameter, and 112 μm² effective area. The parts of the GAWBS spectrum that is parallel and orthogonal to the incident laser is shown separately. As discussed above, the orthogonal portion is only generated by the $TR_{2m}$ modes, however, the parallel portion has contributions from both $TR_{2m}$ modes and $R_{0m}$ modes.

This can be seen in the close up of FIG. 6 which is shown in FIG. 7. On the other hand, Eqs. (35,36) are based on the power under GAWBS peaks generated by $R_{0m}$ modes. Therefore, we must first isolate the GAWBS peaks from $R_{0m}$ modes.

As explained above, one third of the power of the GAWBS peaks from $TR_{2m}$ modes are in the parallel polarization, whereas two thirds of it are in the orthogonal. This can be seen in FIG. 7. Therefore, we can remove the GAWBS peaks generated by $TR_{2m}$ modes in parallel GAWBS peaks by subtracting one third of its power. The resulting GAWBS peaks which are generated only by $R_{0m}$ modes are shown in FIG. 8. On the figure the peaks corresponding to individual peaks are also shown. However, each peak is broadened by damping caused by the polymer coating. Fortunately, all the peaks are well separated and easily identifiable.

This means we can easily integrate the power contained in each peak, which will give us $P_G(f_m)$. To do this more accurately, first we will fit each peak with a Lorentzian function as shown in FIG. 9. We see that when we add up individual Lorentzian fittings, we get a very good fitting of the original measured spectrum. This means if we add up the power contained under each Lorentzian peak, we would be getting an accurate estimate of the power in each GAWBS peak, which is $P_G(f_m)$ that we need to insert into Eq. (38).

By comparing the solutions of Eq. (40), with the frequencies of the measured GAWBS peaks from the $R_{0m}$ modes and also by comparing the solutions of Eq. (6) for n=2 with the measured frequencies of the $TR_{2m}$ modes, we obtain the best fitting values for $$\frac{\alpha}{y_d}=1.07\times 10^{-2}s, \text{ and } \frac{\alpha}{V_s}=1.719\times 10^{-2}s,$$

respectively. From these values we get $\alpha=0.622$ which agrees with previous reports. Together with the measured values of the frequencies of the $R_{0m}$ GAWBS peaks $f_m$, and estimated values of $$\frac{\alpha}{V_d},$$

we obtain $\beta_m$ as shown in Eq. (36). With $\beta_m$ values we can calculate the strain function $S(\beta_m x)$ in Eq. (36), and finally we can calculate the mode-field distribution using Eqs. (38-39)

FIG. 10 shows square of mode field distribution we obtained from the example measurement shown in yellow, and as a reference square of the mode field distribution that is expected from a simple-step index fiber with an effective area of 112 μm². We see that they agree quite well, except that the recovered mode field distribution exhibits undulations. These undulations are caused by not having sufficient number of measured GAWBS peaks. In this example we only had 17 peaks in total. Having a cut-off after the $17^{th}$ peak is equivalent to having an aperture that causes these undulations. To have a more accurate estimation of the mode-field diameter requires more peaks considered. To demonstrate this we show a numerical example in FIG. 11.

Mode field distribution of a step index fiber similar to a standard single-mode fiber with 80 µm² effective area, and a cut-off wavelength of 1290 nm, is calculated and shown in FIG. 11. From the GAWBS peak spectrum, we recover the mode field distribution and plot in FIG. 11.

In FIG. 11—in one plot—we used 60 GAWBS peaks for recovery, in the other plot we used only 25. It is clear that the more GAWBS peaks are used, the better the recovery of the original mode field distribution. Note that in these figures, we plotted the mode-field distribution f(r) directly as opposed to the mode-field distribution squared $f(r)^2$.

It is worth noting that the integral in Eq. (35) is not necessarily a positive function, however, in the measurements only its square is available to us, which creates an uncertainty. Fortunately, in most cases the integral is a smooth enough function that, the negative portions of the functions can be recovered from its square, in a similar fashion that is done in the case of the standard procedure for recovering the near-field distribution from the far-field intensity measurements as opposed to using the far-field field distributions.

Another aspect of having limited number of GAWBS peaks is that the undulations does not decay along the radial direction. This means, even small deviation causes a large error in calculating the effective area. To get an accurate estimation of the effective area we need to measure and include a large number of GAWBS peaks. FIG. 12 shows the percentage error we make in estimating the effective are as a function of number of GAWBS peaks used where the percentage error is defined as:

$$e_\% = 100 \times \left( \frac{A_{\textit{eff-rec}} - A_{\textit{eff}}}{A_{\textit{eff}}} \right) \quad (41)$$

In many cases however where we are interested only in effective area rather than the mode field distribution, we can assume a best guess for the mode-field distribution, for instance we can assume the fiber is well-approximated by a step-index core with small index difference. Then the mode field distribution can be expressed in terms of Bessel functions. The we can use Aeff as a free parameter that will best fit the measured GAWBS power spectrum to the one expected from the assumed mode-field distribution.

In FIG. 13, it shows the measured GAWBS spectrum for standard single mode fiber with a nominal effective area of 80.7 µm². Using the theory outlined above, we fit with expected GAWBS spectrum, assuming that the fiber is a weakly guiding step index fiber. The mode-field distribution of such a fiber is fully determined by a parameter pair, which we chose as core diameter and cut-off wavelength. By varying these two parameters and minimizing the mean square error between the theory and the measurement, we get, core radius=4.08 and cut-off wavelength=1.28 The effective area obtained from this best fit=79.1 µm² compared to the nominal 80.7 µm².

At this point, while we have presented this disclosure using some specific examples, those skilled in the art will recognize that our teachings are not so limited. Accordingly, this disclosure should be only limited by the scope of the claims attached hereto.

The invention claimed is:

1. A method for estimating mode field distribution in optical fibers from guided acoustic wave Brillouin scattering, said method comprising:
   operating an arrangement providing for the accurate measurement for guided acoustic-wave Brillouin scattering (GAWBS), to determine the guided-acoustic-wave Brillouin scattering exhibited by an optical fiber under test (FUT);
   said arrangement including:
      a coherent optical receiver having a local oscillator input port and a signal port;
      a length of polarization maintaining (PM) optical fiber in optical communication with the coherent receiver LO port;
      the length of an optical fiber under test (FUT) in optical communication with the coherent receiver signal port;
      a continuous-wave (CW) laser in optical communication with the PM optical fiber and the FUT; and
      a calibrating laser (Laser-cal) in optical communication with the FUT;
   said arrangement configured such that
      light is output from the Laser-cal and light is output from the CW laser;
      the light output from the CW laser is split into two beams, one beam directed into the PM optical fiber and the other beam directed into the FUT;
      the light output from the Laser-cal is combined with the CW laser beam directed into the FUT;
      the coherent receiver receives light from the CW laser at its LO port and the combined Laser-cal output light and CW light at its signal port;
      the light received at the LO port and combined light received at the signal port is detected by a plurality of photodetectors and photodetector output signals resulting therefrom are subsequently filtered by respective bandpass filters;
      the filtered output signals are digitized through the effect of an analog to digital converter (ADC); and
      the GAWBS output spectrum is determined from digitized output signals of the ADC; and
   estimating the optical mode-field distribution from the GAWBS from the GAWBS spectrum.

2. The method of claim 1 wherein the light for which the optical mode-field distribution is determined is light that always remains within the FUT.

3. The method of claim 2 wherein the optical mode-field distribution estimated is an average of mode-field distribution along the length of the FUT.

4. The method of claim 3 further comprising measuring and determining the GAWBS spectrum in both polarizations.

5. The method of claim 4 further comprising isolating GAWBS peaks in the GAWBS spectrum from ROm modes.

6. The method of claim 5 further comprising determining strain functions for the ROm modes.

7. The method of claim 6 further comprising determining a mode-field square value from an inverse transform.

8. The method of claim 7 further comprising estimating the mode-field from the mode field square.

* * * * *